US009683854B2

(12) United States Patent
Emigh

(10) Patent No.: US 9,683,854 B2
(45) Date of Patent: Jun. 20, 2017

(54) PRICING BY HISTORICAL COMPARISON

(76) Inventor: Aaron T. Emigh, Incline Village, NV (US)

( * ) Notice: Subject to any disclaimer, the term of this patent is extended or adjusted under 35 U.S.C. 154(b) by 1437 days.

(21) Appl. No.: 12/804,320

(22) Filed: Jul. 19, 2010

(65) Prior Publication Data

US 2011/0016020 A1 Jan. 20, 2011

Related U.S. Application Data

(60) Provisional application No. 61/226,742, filed on Jul. 19, 2009.

(51) Int. Cl.
*G06Q 30/00* (2012.01)
*G01C 21/34* (2006.01)
*G06Q 30/02* (2012.01)
*G06Q 30/06* (2012.01)

(52) U.S. Cl.
CPC ............ *G01C 21/34* (2013.01); *G06Q 30/02* (2013.01); *G06Q 30/0631* (2013.01)

(58) Field of Classification Search
CPC .......................................... G06C 30/06–30/08
USPC .......................................... 705/26, 26.1–27.2
See application file for complete search history.

(56) References Cited

U.S. PATENT DOCUMENTS

| | | | |
|---|---|---|---|
| 6,006,218 A * | 12/1999 | Breese et al. | |
| 2006/0149618 A1 * | 7/2006 | Balin et al. | 705/14 |
| 2008/0040143 A1 * | 2/2008 | Freeman et al. | 705/1 |
| 2008/0215455 A1 * | 9/2008 | Leggett et al. | 705/26 |
| 2008/0319918 A1 * | 12/2008 | Forlai | 705/80 |
| 2010/0017299 A1 * | 1/2010 | Pirani | 705/26 |
| 2010/0057586 A1 * | 3/2010 | Chow | 705/26 |
| 2010/0070367 A1 * | 3/2010 | Ananian | 705/14.54 |

OTHER PUBLICATIONS

Rubin, J., ":Log Analysis Pays Off" (Network Computing,, Sep. 16, 2004, vol. 15, iss. 18, pp. 76-78).*

* cited by examiner

*Primary Examiner* — Ethan D Civan

(57) ABSTRACT

In some embodiments, techniques for pricing may include detecting a visitor at an e-commerce site, determining that an item offered for sale at the e-commerce site is of potential interest to the visitor, detecting another e-commerce site at which the user has viewed the item, determining a historical price, wherein the historical price is associated with a web page, wherein the web page offered the item at the other e-commerce site, calculating an offering price, wherein the offering price is based on the historical price, offering the item to the visitor at the offering price, and selling the item to the visitor at the offering price.

24 Claims, 6 Drawing Sheets

PRICING BY HISTORICAL COMPARISON

CROSS REFERENCE TO RELATED APPLICATIONS

This application claims priority to U.S. Provisional Patent Application No. 61/226,742, entitled INFORMATION PROCESSING, filed Jul. 19, 2009, which is incorporated herein by reference for all purposes.

FIELD OF THE INVENTION

The present invention relates generally to the area of electronic commerce. More specifically, techniques for pricing based on browsing history are disclosed.

BACKGROUND OF THE INVENTION

A wide variety of products and services are available electronically. E-commerce vendors endeavor to price competitively. In many cases, such pricing may include per-customer pricing based on customer profiling. However, while an e-commerce vendor would typically like to offer a user an appealing price, such as the lowest price the user has seen, they do not wish to cut into their profit margins by offering a lower price than they have to. Current approaches do not permit an understanding of what competitive pricing a user has seen, and therefore a vendor will often price an offering too high, losing the business, or too low, cutting into profits.

Accordingly, it would be useful to be able to price offerings according to what pricing a user has historically seen.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
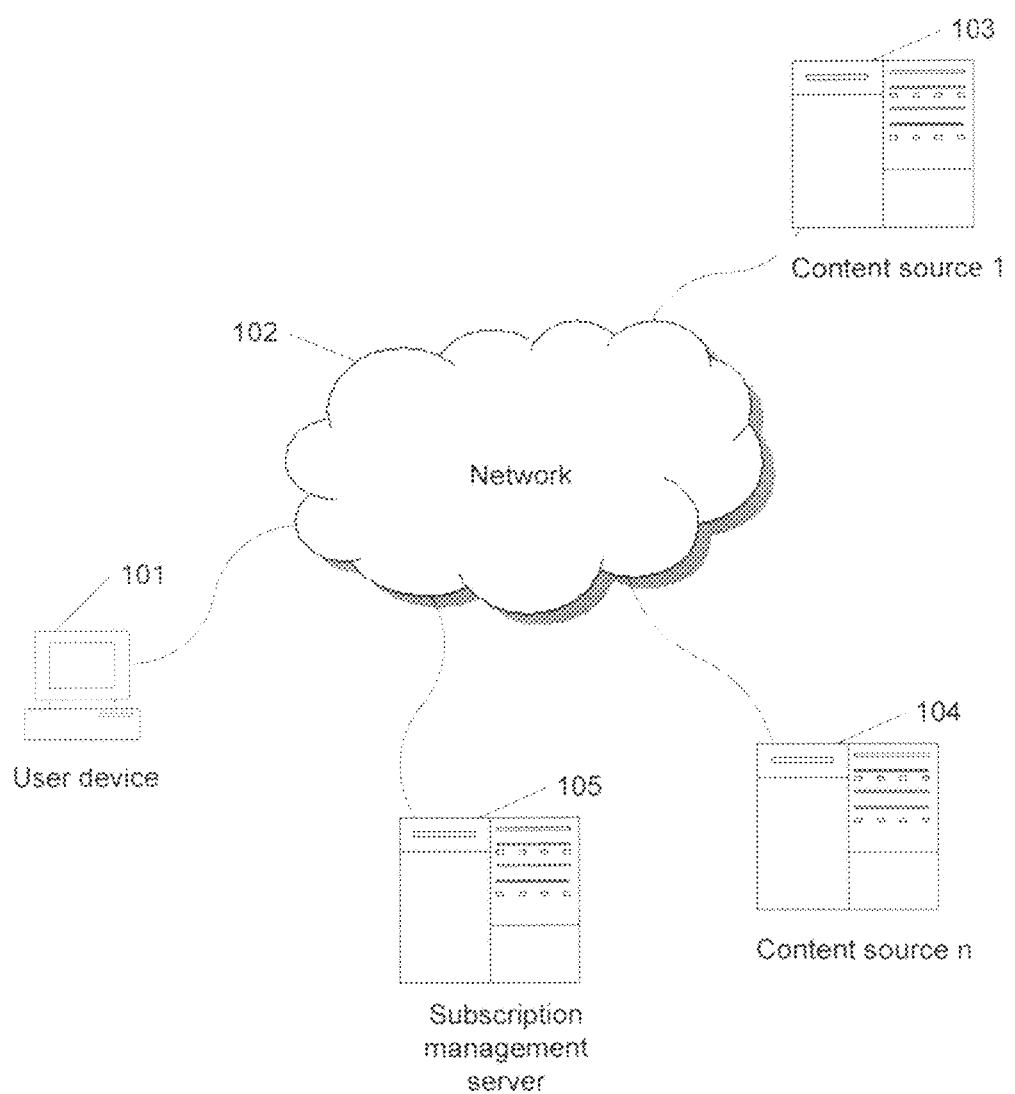
FIG. 1 is a diagram of a system for content selection and/or enrollment, according to some embodiments.

FIG. 1 is a diagram of a system for content selection and/or enrollment, according to some embodiments. Enrollment refers herein to subscription to one or more sources of content, for example syndicated content such as content distributed using a content syndication format such as RSS or Atom. In this example, a user device 101 is connected to a network 102. A user device 101 may be any device capable of receiving content, including a personal computer, PDA, or cell phone.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet. An example of the use of such a network is for a user device 101 and an optional subscription management server 105 to be connected via a local area network such as an enterprise network, and for the local area network to be connected to content sources 103, 104 via a public network such as the internet.

In some embodiments, one or more content sources such as content source 1 103 and content source n 104 are connected to the network 102. A content source may provide content, such as syndicated content or advertisement(s), via the network 102. In some embodiments, such content may be provided to a user device 101. In some embodiments, such content may be provided to a subscription management server 105. In some embodiments (not shown), such content may be provided to a content aggregator such as an online content reader.

In some embodiments, a content source 103, 104 may provide one or more specific content items such as advertisements. In some embodiments, a content source 103, 104 may provide syndicated content such as advertisements from multiple sources. In some embodiments, a content source 103, 104 may provide a single feed of content. In some embodiments, a content source 103, 104 may provide a plurality of feeds of content. A feed refers herein to any collection of content receivable to enrolled recipients (e.g. via subscription) available from a content source. Examples of feeds include content available from an address such as a URL via RSS or Atom.

In some embodiments, a subscription management server 105 may be connected to the network 102. The subscription management server 105 may enroll user device 101, and/or a user associated with user device 101, in one or more content feeds. In some embodiments, the subscription management server 105 may be associated with a content reader such as an RSS and/or Atom reader.

In some embodiments, techniques for content selection and/or enrollment may be run on a user device 101 and/or a subscription management server 105. Details of such intelligent content selection and enrollment are discussed in conjunction with the remaining figures.

Figure 2:
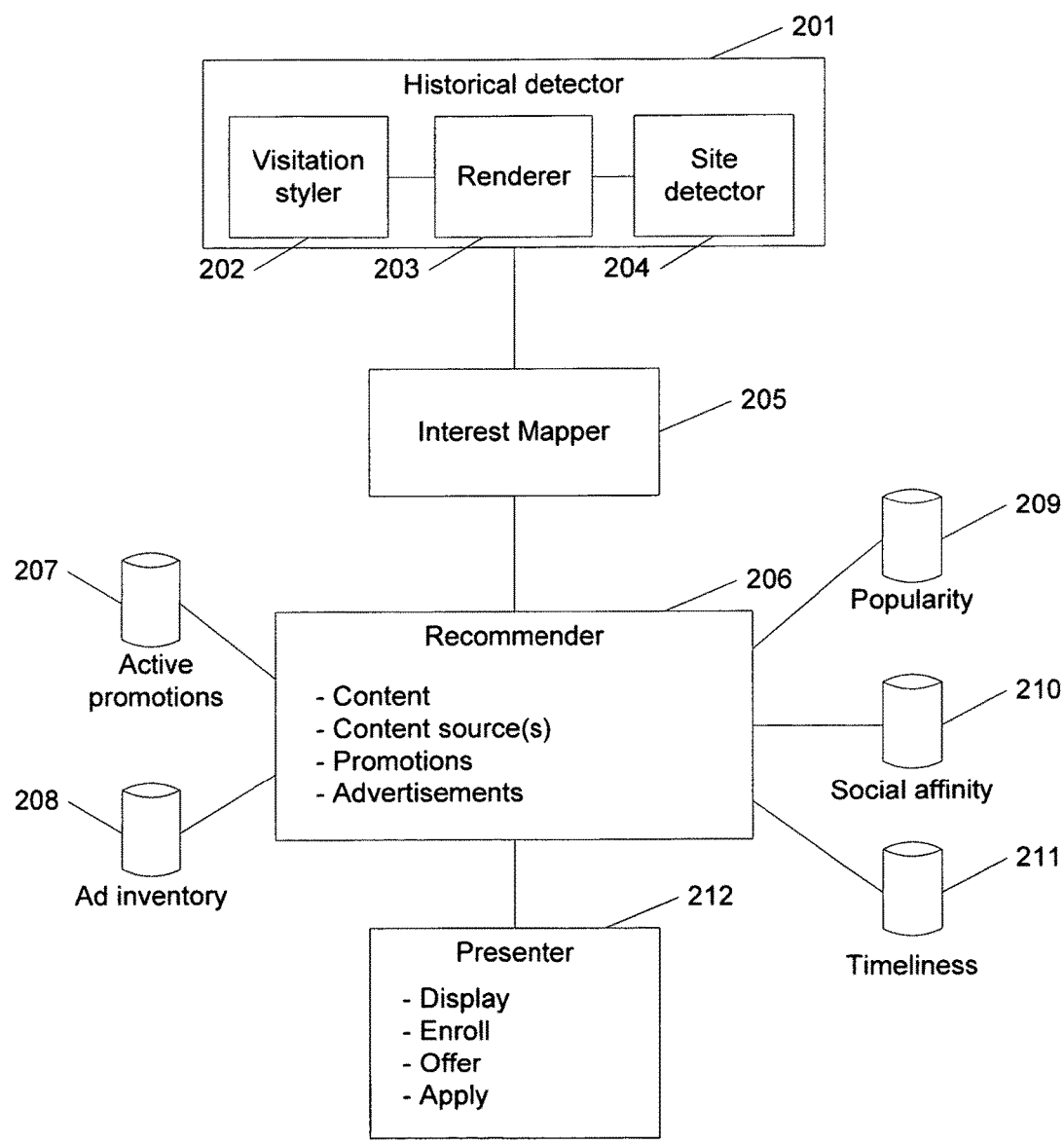
FIG. 2 is a diagram of a system for selecting and/or enrolling for content, according to some embodiments.

FIG. 2 is a diagram of a system for selecting and/or enrolling for content, according to some embodiments. In this example, a historical detector 201 detects one or more historical interests. In some embodiments, a historical detector 201 may include a visitation styler 202, a renderer 203 (which may in some embodiments be performed externally, for example by a document browser such as a web browser), and a site detector 204. Further details of the operation of a historical detector 201 are discussed in conjunction with FIG. 4.

A visitation styler 202 may provide associate one or more sites with a distinguishable quality that indicates whether each site (or a member of a set of sites) has been historically visited, for example by including a link to a site and associating the link with a "visited" pseudoclass that provides a distinguishable quality such as invocation of an image load, text size, text color, text position, etc. A site refers herein to a URL, which may include a domain name.

A renderer 203 may render links associated with one or more sites in a manner to cause a distinguishable quality associated with the link to become assigned to the link. In some embodiments, a renderer 203 may be a document browser such as a web browser, which may invoke a "visited" pseudoclass associated with links referring to sites that have historically been visited.

A site detector 204 may detect links that have been visited, for example by determining whether a link has been endowed with a distinguishable quality associated with a visited pseudoclass. In some embodiments, a site detector 204 may be associated with Javascript. In some embodiments, a site detector 204 may be on a server, which may for example detect image requests.

In some embodiments, an interest mapper 205 may map one or more visited sites onto one or more interests. An example of an interest is a keyword. Another example of an interest is an identifier that is used to identify an interest. In some embodiments, an interest mapper 205 may be the identity mapper, i.e. may simply pass through one or more visited sites.

A recommender 206 may determine one or more items relevant to one or more historical interests. One example of an item relevant to a historical interest is content, such as a story, image, video, web page, etc. Another example of an item relevant to a historical interest is a content source, such as a source of a feed such as an RSS or Atom feed. Another example of an item relevant to a historical interest is a promotion, such as a discount, an affiliate program, a loyalty program such as airline frequent flyer miles, etc. Another example of an item relevant to a historical interest is an advertisement.

A recommender 206 may make use of various data in the course of determining one or more items relevant to one or more historical interests. In determining that a promotion is relevant, a recommender 206 may make use of a set of active promotions 207, which for example may be associated respectively with one or more interests. In determining that an advertisement is relevant, a recommender 5xz06 may make use of an advertising inventory 208, which may contain one or more advertisements that are respectively associated with one or more interests, such as keywords. In determining one or more items of content or content sources that are relevant, a recommender 206 may make use of data associated with the content or content source(s), for example popularity 209, social affinity of the user for whom a recommendation is being made 210, and/or the timeliness of content 211, such as a publication date associated with content.

A presenter 212 may present one or more items associated with one or more historical interests. An example of presenting an item is to display the item, such as a story, web page or advertisement, for example by providing it to be rendered by a document browser such as a web browser. Another example of presenting an item is to enroll a user in the item. An example of enrolling a user in an item is to subscribe the user to a content source, for example by updating a set of feed subscriptions to include the content source. Another example of presenting an item is to offer or apply a promotion such as a discount, affiliate program, or loyalty program such as a frequent flyer miles program.

Figure 3:
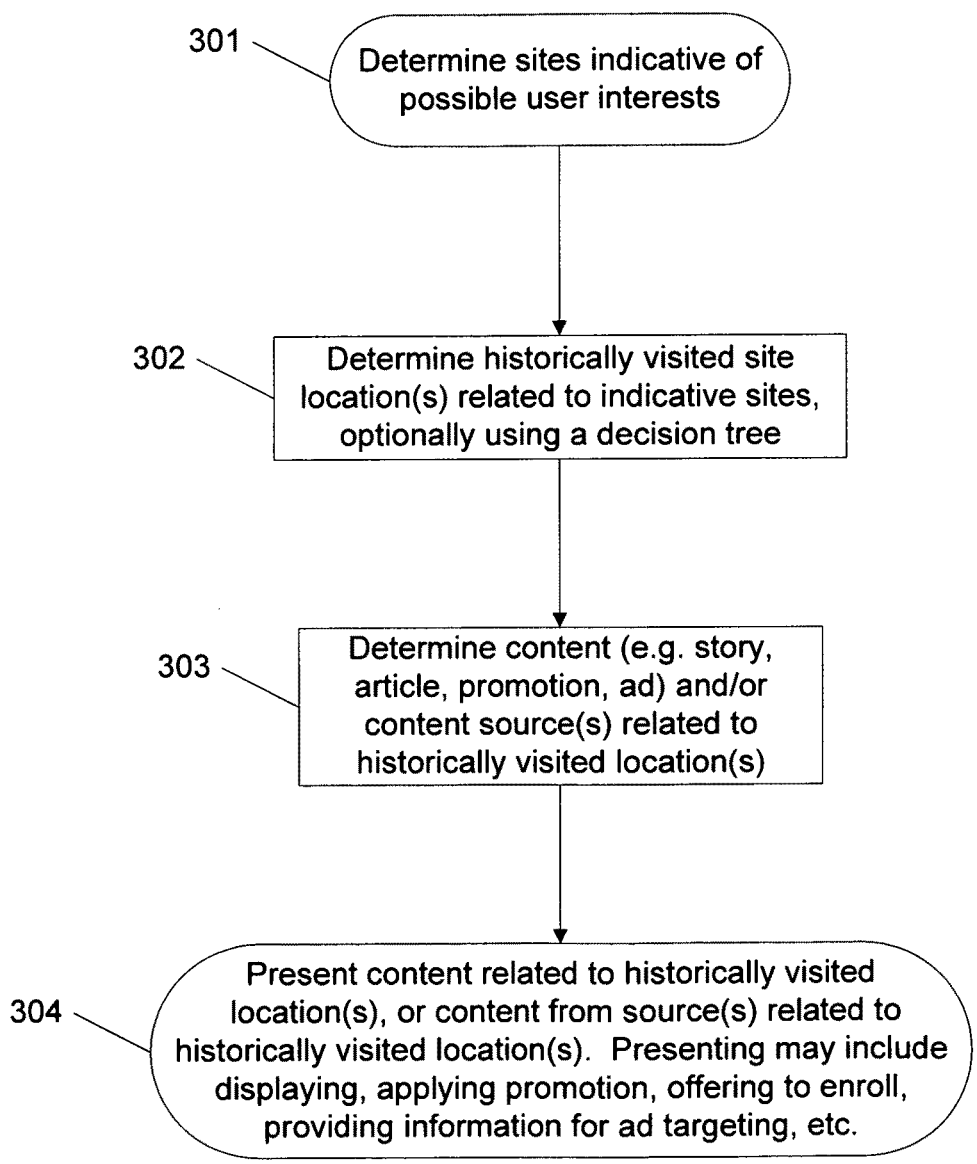
FIG. 3 is a flow diagram of a method for enrollment and/or content selection, according to some embodiments.

FIG. 3 is a flow diagram of a method for enrollment and/or content selection, according to some embodiments. In this example, one or more sites indicative of possible user interests may be determined (301). An example of determining sites indicative of possible user interests is to designate a predetermined set of URLs, wherein a URL is associated with a site related to one or more interests related to the site. In one example, a site such as www.nytimes.com may be associated with a content source such as a New York Times headline news feed, and/or an interest in content sources reflecting an imputed interest, such as news feeds in general. In another example, a site indicative of possible user interest may be associated with more specific content, such as a reference to a particular item and/or area of content. In another example, a site may be associated with one or more keywords. In another example, a site may be associated with a promotion, such as an offer for a discount or enrollment in an affiliate program or a loyalty program such as a frequent flyer miles program. In another example, a site may be associated with an advertisement, for example an advertisement that may be displayed to visitors who have previously visited the site.

One or more historically visited site locations related to indicative site(s) may be determined (302). An example of determining a historically visited site location related to an indicative site is discussed in conjunction with FIG. 4. In some embodiments, the number of URLs to be checked may be reduced (relative to checking all URLs of potential interest), by using a decision tree to determine what URLs to check. For example, if is determined that the user has visited Amazon.com, then various Amazon-related (either on Amazon or on related sites) URLs may be checked. If it is determined that the user has visited a popular political site, then other less popular political sites (for example sites indicating a similar general interest or orientation, or sites reflecting a variety of political interests or orientations) may be checked. If a user is determined to have visited a general site such as the Washington Post or a section/URL such as a Sports section thereof, then more specific pages such as particular pages in the site or section may be checked. An example of this application is to check current or historical stories relating to a site the user has visited, and determine which pages navigable from pages related to the user's visitation history the user chose to navigate. In some embodiments, this may be used, either alone or in combination with information about pages the user could have navigated to but chosen not to, for any or all of the various applications disclosed previously and herein.

Content and/or one or more content sources associated with historically visited site(s) may be determined (303).

An example of determining content associated with a historically visited site is to determine content from a site or feed associated with a historically visited site, for example a New York Times headline news feed associated with www.nytimes.com. Another example of determining content associated with a historically visited site is to determine content extrapolated to be of interest based on one or more previously visited sites, for example by a recommendation engine such as a collaborative filtering engine or by performing cluster analysis and presenting content within the same cluster as historically visited site(s).

In some embodiments, selection of content may include other criteria. One example of a criterion for selection of content is the popularity (209 of FIG. 2) of content, for example the global popularity of content and/or the popularity of content among an affinity group associated with the user (210 of FIG. 2). One example of an affinity group is a group explicitly joined by the user, such as a web of trust of friends. Another example of an affinity group is a group analytically determined to be associated with the user, for example by analysis of the user's interests and correlation with the interests of others. An example of popularity of content among an affinity group is a count of one or more readings and/or endorsements of the content among member(s) of the affinity group. Another example of popularity of content among an affinity group is one or more interests associated with the content, for example in the form of keywords or tags, that have been selected by member(s) of the affinity group. An example of selecting content using such criteria is to score content items based on such factors, for example in which timeliness is used as an exponential decay factor (for example, with a half-life of one day), endorsements count as a point, and endorsements from socially affine users count as an additional point, and selecting the highest-scoring related content item(s).

Another example of a criterion for selection of content is content associated with a feed to which a user has subscribed. For example, content may be selected from among articles associated with feeds to which a user has subscribed, based on specific articles a user is determined to have read outside a feed reading environment. In various embodiments, such article reading may be performed independently or in combination with a determination of user activity and/or preferences associated with articles read using a feed reader.

In some embodiments, determining content associated with historically visited site(s) may include mapping interests, for example as discussed in conjunction with interest mapper 205 of FIG. 2. An example of mapping interests is to select one or more keywords based on historically visited site(s), for example by looking up the sites in a hash table, database, or other dictionary data structure and retrieving keyword(s). In some embodiments, multiple interests may be deduced, and one may be selected, for example the strongest, or randomly selected, with a probability related to the strength of an interest. An example of determining a strength associated with an interest is to determine a number of sites or URLs associated with the interest that a user has previously visited, and using such number as a strength metric. In some embodiments, such keywords may subsequently be used to target content, such as one or more advertisements and/or promotions. An example of such targeting is using an interest as a category or keyword to an advertising server for targeted advertising, for example using a mechanism such as GoogleKW keyword(s) in Google's AdSense.

In some embodiments, determining content associated with historically visited site(s) may include determining a promotion associated with a site. An example of determining a promotion associated with the site is to look up the site in a mapping such as active promotions 207 of FIG. 2 and determine a promotion associated with the site. Examples of a promotion include a discount, an affiliate program, and a loyalty program such as an airline frequent flyer program. In some embodiments, a promotion may be offered. In some embodiments, a promotion may be automatically applied.

An example of determining a content source associated with a historically visited site is to determine a content feed in a direct association with a historically visited site, for example a New York Times headline news feed associated with www.nytimes.com. Another example of determining a content feed associated with a historically visited site is to determine a class of content feeds associated with a historically visited site, for example news feeds associated with www.nytimes.com (which may in some embodiments include one or more news feeds unaffiliated with the New York Times).

In some embodiments, a user interface may be presented allowing the user to confirm and/or select from among feeds associated with historically visited site(s), for example by presenting one or more feeds and/or classes of feeds and allowing selection of feeds in which enrollment is desired, for example by presenting a checkbox next to a feed and enabling selection and/or deselection of the checkbox.

In some embodiments, additional feeds may be recommended and/or selected, for example feeds that are determined to be related to one or more feeds and/or classes of feeds associated with historically visited site(s). In some embodiments, such additional feeds may be recommended and/or selected using a recommendation engine such as a collaborative filtering engine.

Content determined to be related to historically visited location(s), or content from source(s) determined to be related to historically visited location(s), directly or indirectly, may be presented (304).

An example of presenting content from a source is to subscribe to a feed from the source, for example by adding the feed to a list of subscriptions, for example a list in OPML format or in a database, at a user device such as user device 101 of FIG. 1 and/or a subscription management server 105 of FIG. 1. In some embodiments, content associated with the feed(s) may be presented, for example by displaying in a content reader. Such subscription may in various embodiments be performed automatically, or may be preceded by presenting a user interface offering an option to subscribe.

An example of presenting content is to display the content (which may include a story from a syndicated content source, an article which may or may not have been syndicated, an advertisement, etc.) in a content reader, for example by providing it at a web site. Another example of presenting content is to present, apply or offer to apply a promotion, such as a discount, an affiliate program such as a cross-promotional offer, or a loyalty program such as an airline frequent flyer program.

In some embodiments, preferences may be determined locally as described above, and transmitted to a server relating to advertising. In some embodiments, such preferences may be transmitted as web pages for which visitation has been detected. In some embodiments, such preferences may be transmitted as keywords or identifiers (which may or may not be unique, in various embodiments) associated with such web pages, for example in a data structure such as a hash table or array in which a page and a keyword or identifier may be associated. In some embodiments, transmission may be server-to-server. In some embodiments, transmission may be initiated from the client. For example, the client may be caused (for example by Javascript, or by insertion by the server of a URL in HTML that the client loads) to access a URL that encodes such preference information. An example of encoding such preference information is to URL-encode the page names and/or keywords and add them as one or more parameters to an access to a host associated with advertising. Such a host may receive a cookie from the client, and may associate preference information with an identifier in the cookie and/or update such preference information already stored; and may extend the lifetime of the cookie, for example by ensuring it has at least a minimum amount of lifetime remaining. Such a host may provide a cookie to the client (for example if no cookie is found), containing an identifier with which it has associated with preference information (for example a newly generated identifier, if the user was not previously identified). In some embodiments, such a cookie may include encoded preference information. When a client requests an advertisement, for example because a URL referring to an advertising server is contained in a web page loaded at the client, a cookie such as the cookies disclosed above may be sent to the advertising server, for example because a domain and/or subdomain matches the (sub)domain of the cookie. An advertising server receiving such a cookie may determine preferences that are encoded in the cookie, and/or associated with an identifier encoded in the cookie (for example via a relational database containing a table in which the identifier is used as a key), and may target an advertisement according to the user's detected preferences. Such targeting, and the use of cookies, are well-known to those skilled in the art.

Figure 4:
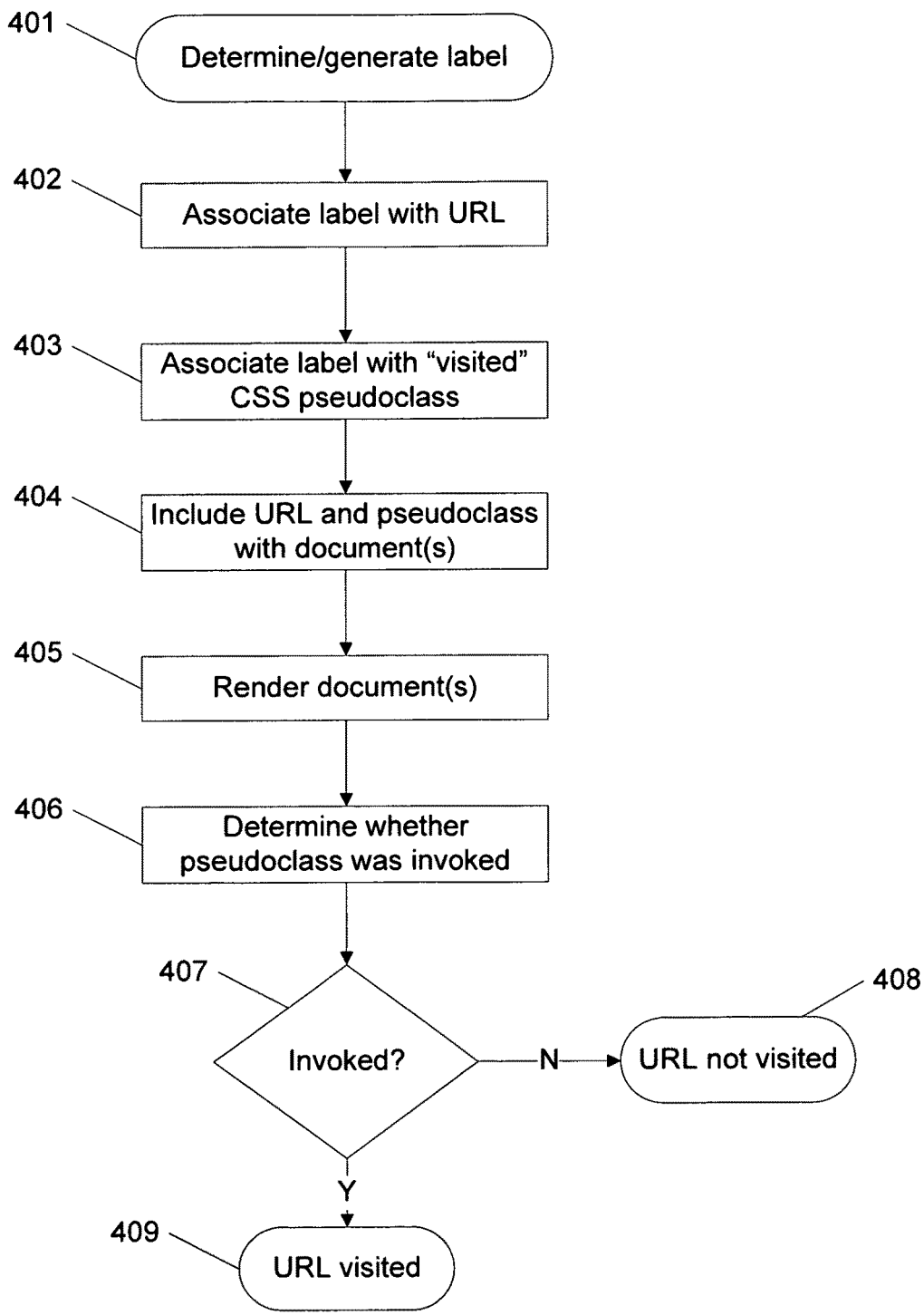
FIG. 4 is a flow diagram of a method for determining a historically visited site, according to some embodiments.

FIG. 4 is a flow diagram of a method for determining a historically visited site, according to some embodiments. An example of a historically visited site is a URL associated with a browser history. In this example, a label may be determined or generated (401). An example of determining a label is to use a predetermined label. Another example of generating a label is to use a label including a sequentially assigned component such as a successively incrementing counter.

The label may be associated with a URL (402). An example of associating the label with a URL is to associate the label with an "id" attribute, and associate the "id" attribute with the URL. For example, to associate the label "label1" with the URL www.nytimes.com, a tag may be created such as <a id="label1" href="http://www.nytimes.com/"></a>

In some embodiments, such a labeled URL may be associated with a <div> tag, wherein the <div> tag is associated with a class. For example, an enclosing <div> tag may be created such as

```
<div class="foo"><a id="label1"
    href="http://www.nytimes.com/"></a><div></div></div>
```

The class associated with the div may be modified by style information. For example, the following style information may be associated with a class associated with a URL, making it invisible and setting its positioning to absolute:

```
.foo {
    position: absolute;
    visibility: hidden;
}
```

The label may be associated with a pseudoclass associated with a previously visited URL (403). In some embodiments, a pseudoclass may be associated with a <style> tag and/or a cascading style sheet (CSS). An example of a pseudoclass associated with a previously visited URL is the "visited" pseudoclass. In some embodiments, a pseudoclass may include a reference to a server such as subscription management server 105 of FIG. 1. For example, the following "visited" pseudoclass may indicate to the server at https://www.subscriptions.com that the url labeled "label1", numbered "1" and associated with a session designated as "238746" has been visited:

```
#label1:visited { background:
    url(https://www.subscriptions.com/?url=1&session=238746); }
```

In some embodiments (not shown), a cookie may be used instead of or in addition to a session designation.

In some embodiments, a pseudoclass may set a property in a document object model (DOM) indicating that the URL has been visited. Examples of such properties include color, location and height, which may for example be indicated respectively (using different specific forms of style directives for illustrative purposes) as follows:

```
a:visited { color: red; }
#label1:visited { top: 100px; }
a { display: block; height: 30px; }
:visited { height: 100px; }
```

In some embodiments, such as setting the color or height as illustrated above, the association between the label and the pseudoclass may be implicit, e.g. a single rule may suffice for multiple labels.

The URL with associated label and the pseudoclass may be included in one or more documents (404), such as HTML documents.

The document(s) may be rendered (405), for example by a browser at a user device such as user device 101 of FIG. 1.

It may be determined whether the pseudoclass was invoked for the URL (406). One example of determining whether the pseudoclass was invoked is to determine at a server whether a URL associated with the visitation, such as a URL associated with a background image in a visited pseudoclass, was requested. Another example of determining whether the pseudoclass was invoked is to determine whether a property associated with the URL, such as color, location or height, has been set in a manner consistent with the pseudoclass having been invoked. An example of determining such a property is to check with a script such as a Javascript, for example by querying using the document.getElementById method and comparing the value to the value expected. As examples of such a query, a top position of a labeled element of a document may be obtained using document.getElementById('label1').offsetTop or document.getElementById('label1').nextSibling.offsetTop (which may for example be used in implementations respectively without and with use of an enclosing <div> tag, as shown above).

If it is determined that the pseudoclass was not invoked (407), then in this example it is determined that the URL was not historically visited (408). If it is determined that the pseudo class was invoked (407), then in this example it is determined that the URL was historically visited (409).

Figure 5:
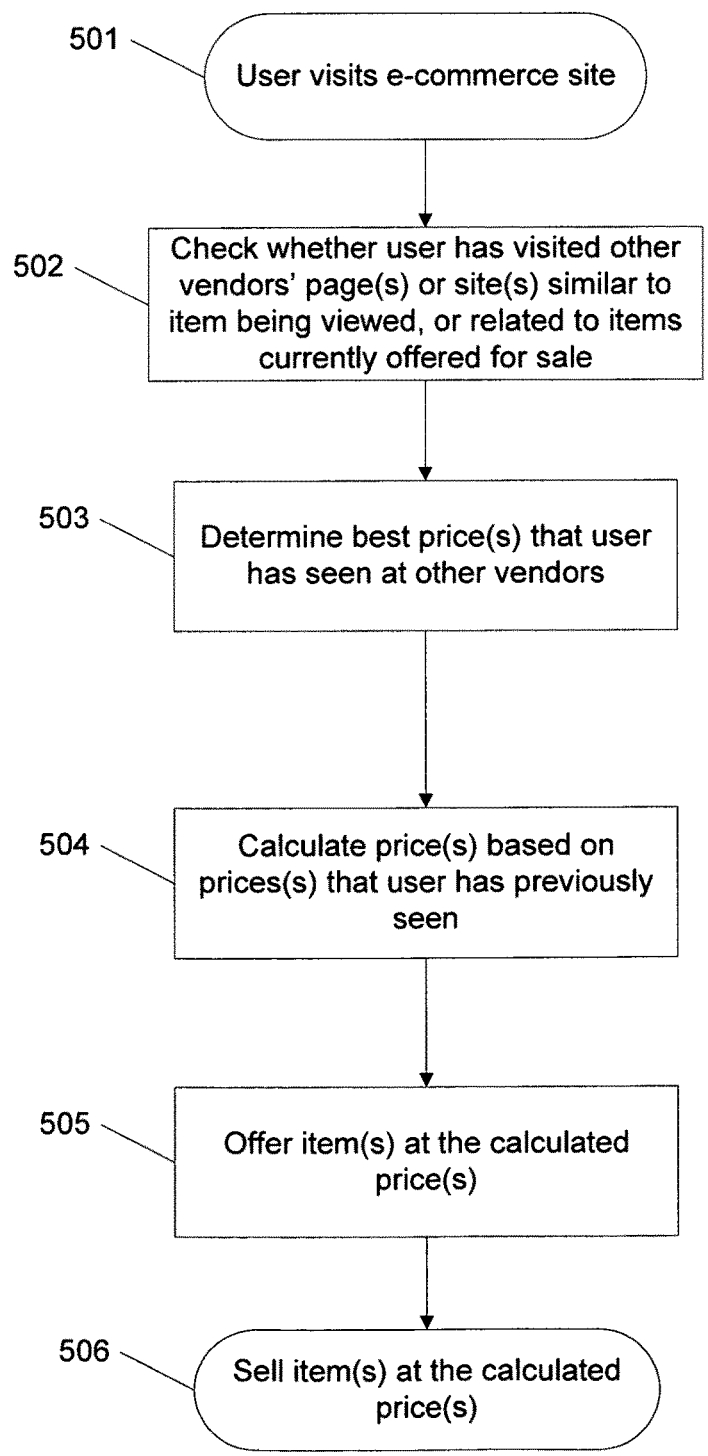
FIG. 5 is a flow diagram of a method for pricing based on browsing history, according to some embodiments.

FIG. 5 is a flow diagram of a method for pricing based on browsing history, according to some embodiments. In this example, an e-commerce site is visited by a user and a page such as an HTML page is requested by a protocol such as HTTP (501).

It may be determined whether the user has visited other vendors' page(s) or site(s) that is the same as or similar to an item being viewed at the e-commerce site, or to one or more items offered for sale at the e-commerce site (for example items currently available at a promotional price, or obtained cheaply, or popular items) (502). An item may refer herein to a real, virtual, substantial, or insubstantial item for sale, rental or subscription (subsequent discussion refers to these as for sale, without loss of generality).

Such determination may be performed as described above, for example by generating a set of URLs corresponding to one or more such items and may be determined or affected by determining that a visitor, such as a visitor to a web site, has previously visited one or more sites or URLs associated with sale of the same or similar item(s), for example as discussed in conjunction with FIG. 4. In another example, a browser add-in component such as a shopping toolbar may keep track of page(s), content relating to items for sale, or site(s) and may report such visitation, for example as discussed in conjunction with FIG. 6.

A best price for each relevant item may be determined that the visitor has seen at another vendor (503), for example by checking each page or site corresponding to the item and determining a lowest price, or by consulting information from the browser toolbar that has stored the prices that the user has seen. In some embodiments, prices may be checked dynamically, for example by fetching one or more pages relating to the item for sale on other site(s) that the user has visited (for example by checking a URL the user has visited, or a URL that is otherwise known to relate to the item, such as an item-related page on a site that the user has been determined to have visited). In some embodiments, prices may be crawled, for example by periodic fetching such as daily fetching.

A price can be calculated for the item (for example at the server during construction of a response, which for example can be done with an asynchronous call such as an AJAX call, or with a redirect to a page that is being constructed) which is based on other prices that the user has seen (504). For example, a lowest price may be matched, or beaten by a predetermined amount or percentage, or an amount or percentage relating to the visitor (for example by determining that a visitor meets one or more criteria such as previous purchases, etc.), or may have a premium added to it, or may be processed in any or all of these ways with a threshold such as a minimum price that will be offered. In various embodiments, pricing may or may not include shipping costs.

The item(s) may be offered at the calculated price(s) (505). In one example, an item currently being viewed may be offered at the calculated price. In another example, for example at a landing page (i.e. a page that a user has arrived at from an external location) or at a page not associated with a single item offered for sale, such as a home page or a page associated with a category of merchandise, or results of a search on a search query, at least one item for which an interest has been inferred (for example using techniques described herein, based on the visitor's previous purchase history, and/or on other indicators in his or her history, for example as analyzed or provided by a browser add-in such as a toolbar) may be presented at their respective calculated price(s), for example as search results, or as a sidebar, or as content within a page being viewed.

A sale may be performed at the calculated price(s) for the item(s) (506) using techniques generally known to those skilled in the art of e-commerce, such as adding the item(s) to a shopping basket, checking out, collecting delivery information, receiving and charging payment instruments, etc.

Figure 6:
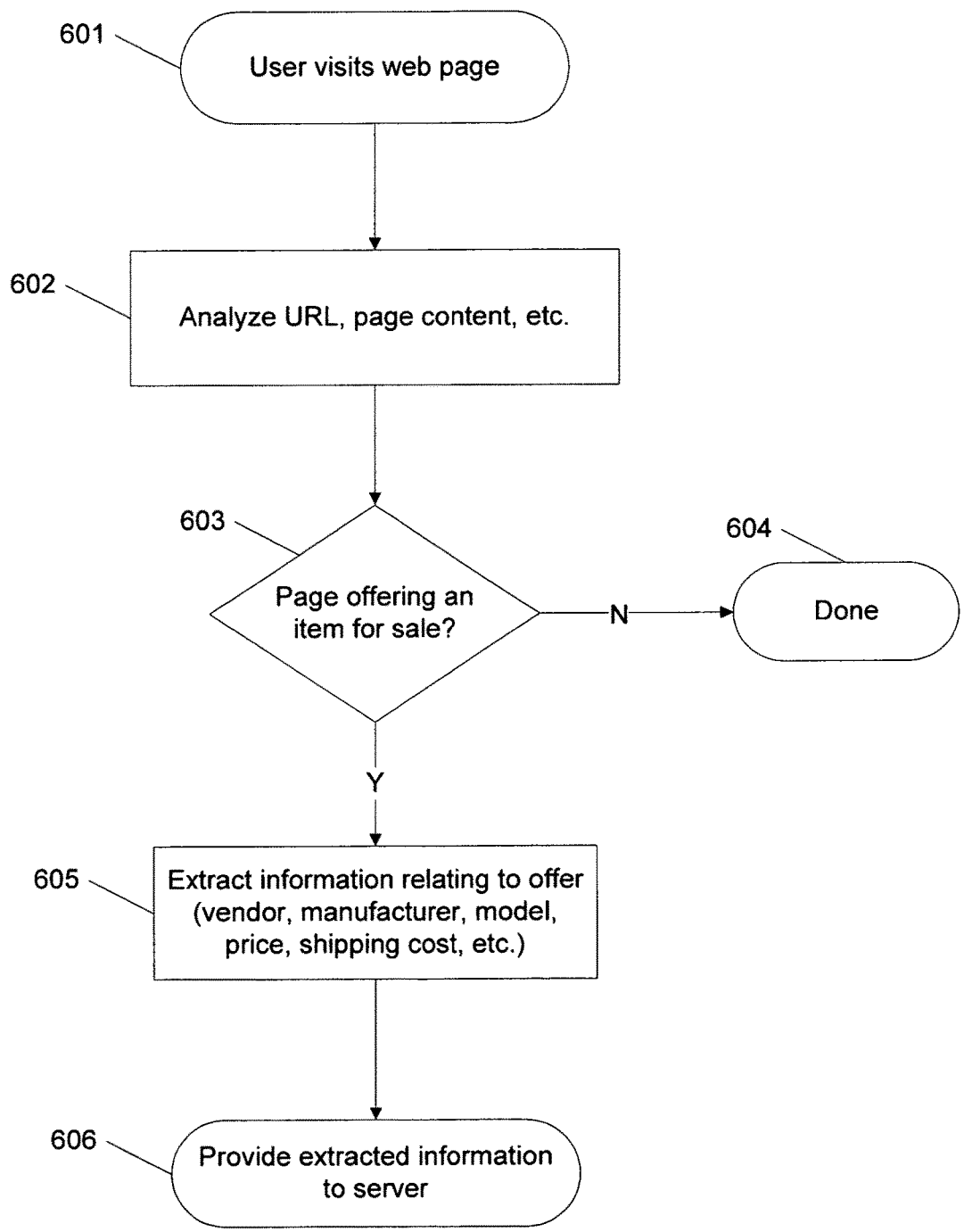
FIG. 6 is a flow diagram of a method for reporting information related to commerce-related visited sites, according to some embodiments.

FIG. 6 is a flow diagram of a method for reporting information related to commerce-related visited sites, according to some embodiments. In some embodiments, the technique of this FIG. 6 may be performed by a web browser, or a browser add-in such as a toolbar. In this example, a user visits a web page (601).

The web page may be analyzed (602). Such analysis may include analysis of the domain (e.g. comparing the domain against a list of known e-commerce domains, or reputable e-commerce domains), URL (e.g. identifying a product name in the URL), the page content (e.g. finding product name/ID in the page content, or structured fields with predetermined characteristics that describe products), etc.

It may be determined whether the page is offering an item for sale (603), for example as a result of the analysis 602. If it is not determined that the page is offering an item for sale (603), then in this example processing is complete (604). In some embodiments, mere visitation of a known e-commerce site, or a known e-commerce site, may be sufficient to trigger reporting, even if the information that is extracted (605) is just the site identity and/or URL.

If it is determined that the page is offering an item for sale (603), then in this example information relating to the item is extracted (605). Examples of information relating to the item include any combinations of the vendor selling the item (e.g. the owner of a site, and/or the owner of a storefront on the site), the manufacturer or marketer of the item, the model name and/or number of the item, an identifier such as an ISBN, shipping costs and terms associated with the item, etc. Such information may be extracted based on a variety of techniques, including searching for structured data (for example in a manner specific to the site serving the page), searching for patterns, for product names or IDs, etc.

The extracted data may be provided to a server (606), for example by transmitting it to a server over the internet. In some embodiments, such data may first be encrypted, and/or may be sent via an encrypted protocol such as TLS. In some embodiments, identifying data such as a product ID or name may be hashed with a one-way cryptographic hash such as SHA1. In some embodiments, information useful for price validation may be provided. For example, if the page was served over TLS, the encrypted page may be provided as it was received from the server, along with a cryptographically signed certificate or a reference thereto that suffices to prove authenticity (the receiver may validate the signature on the certificate, decrypt the page using the decryption key in the certificate, and extract the information itself). In another example, the URL for the page may be provided and the receiver may crawl the page and validate the information.

Recipient-Based Messaging Account Selection

Many users maintain more than one email account. It may be desirable to use one account for a certain type of recipient (such as business correspondents) and another account for another type of correspondent (such as social friends). A recipient refers herein to a name and/or email address to which a message may be sent. In various embodiments, a recipient may be associated with a "to:", "cc:" or "bcc:" header.

A recipient of a message may be used as part or all of a determination of which email account to use when sending an email. In one example, a recipient may be checked against a list of recipients associated with an account (for example by using a hash table, linear search, binary search, database lookup, or other technique known to those skilled in the art), and the associated account may be used if the recipient is found in the list; if the recipient is not found, the recipient may be checked against another list of recipients associated with another account, and the associated account may be used if the recipient is found; and so on until there are no more lists. In another example, a characteristic of a recipient, such as a domain in the recipient's email address (for example "foo.com" in "user@foo.com") may be used in place of the fully specified recipient in the foregoing technique. In some embodiments, a list may be associated with an address book, for example a set of people categorized as (for example) "business," "personal," or "other."

If more than one recipient is specified in an email message, the technique may be applied to each in turn, and if a unique recommended account exists, that account may be used. If conflicting accounts are recommended, then in various illustrative embodiments, an account with a greater number of recommendations may be used; or an account corresponding to a more direct recipient may be used, wherein a recipient associated with a "to:" header may be considered more direct than a recipient associated with a "cc:" header, which may in turn be considered more direct than a recipient associated with a "bcc:" header; or the user may be prompted to determine which account to use; or no recommendation may be considered to have been received.

If no specific account is recommended using this technique, then a default account may be used, and/or a user may be prompted to determine which account to use.

In some embodiments, this type of analysis may be used to warn a user before sending an electronic message, if it is determined that the distribution of recipients suggest that an error may have been made in selecting recipients. For example, if a characteristic of all recipients except one (in some embodiments, only if greater than a certain number of recipients, such as three or four) matches a certain criterion, such as a domain in the recipient's email address (for example "foo.com" in "user@foo.com") or a categorization of users, such as every recipient being categorized as "business" except one categorized as "personal," then the distribution of recipients may be deemed to suggest a potential error in selecting recipients, and the user may be prompted and given the option to continue or to edit the recipient list. Such a warning may, for example, be provided as a pop-up window in an email client, providing an explanation of the potential error and options in user interface elements such as buttons, providing an option to send the email to the specified recipient list, and another that provides the capability to edit the recipient list. In some embodiments, the criteria that are used to determine what distributions of recipients should be considered a potential error may be configurable, and may be stored persistently, for example in a registry, and read at boot time of an email client. In some embodiments, an outgoing MTA (mail server) may detect a suspicious distribution of recipients as discussed above, and may log it, and/or may provide an email back to the sender with links that provide the ability to send the email, to cancel the email, and in some embodiments to edit the recipients of the email. Such links may be to a web server that provides a web page offering such features at the respective link destinations, or a single link may be offered to a web page offering multiple such capabilities.

This technique may be applied in an email client, or web-based email, or any other mechanism to send email. In various illustrative embodiments, this technique may be applied when a directive to send an email has been received, or when data entry focus leaves the header or a recipient addressee area, or incrementally as data is entered, or opportunistically as recipient(s) are entered or as processing capability is available. In some embodiments, the technique may be applied in more than one place, for example by determining an account and optionally displaying the account at any of the above points before the message is sent, and requesting user input (if any is necessitated) when a directive to send the message is received.

In addition to email, this technique may be applied to other forms of electronic messaging, such as instant messaging and SMS messaging. The term "email" is used generically in this disclosure, without loss of generality.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for pricing, comprising executing programmatic instructions at a computing device for:
   detecting a visitor at a first e-commerce site;
   determining that an item offered for sale at the first e-commerce site is of potential interest to the visitor, wherein determining that the item offered for sale at the first e-commerce site is of potential interest to the visitor includes determining that a URL was visited, wherein the URL relates to the item;
   detecting a second e-commerce site at which the user has viewed the item, wherein the second e-commerce site is different than the first e-commerce site;
   determining a competitive price, wherein the competitive price is associated with a web page, wherein the web page has offered the item at the second e-commerce site;
   calculating an offering price, wherein the offering price is based on the competitive price;
   offering the item to the visitor at the offering price at the first e-commerce site; and
   selling the item to the visitor at the offering price.

2. The method of claim 1, wherein determining that the URL was visited includes setting style information associated with a link, wherein the link is associated with the URL.

3. The method of claim 2, wherein setting style information relating to the URL includes defining a "visited" pseudoclass.

4. The method of claim 2, wherein determining that the URL was visited includes receiving a request at a server, wherein the request is associated with the style information.

5. The method of claim 1, wherein determining that the URL was visited includes analyzing data provided by a browser toolbar.

6. The method of claim 1, wherein the user has visited a page associated with the item at the first e-commerce site.

7. The method of claim 1, wherein determining that the URL was visited includes determining an attribute associated with a link, wherein the link is associated with the URL.

8. The method of claim 1, wherein the offering price is the same as the competitive price.

9. The method of claim 1, wherein the offering price is a multiplicative factor of the competitive price, wherein the multiplicative factor is less than one.

10. The method of claim 1, wherein determining the competitive price includes determining that the visitor has previously visited a plurality of competitors, and determining a plurality of competitive prices, wherein the competitive prices are respectively offered by the plurality of competitors, and selecting a minimum from among the plurality of competitive prices as the competitive price.

11. The method of claim 1, wherein offering the item to the visitor at the offering price includes displaying a page dedicated to the item, wherein the offering price is included.

12. The method of claim 1, wherein offering the item to the visitor at the offering price includes providing information relating to the item and the offering price in a sidebar to a page that is provided.

13. The method of claim 1, wherein selling the item to the visitor at the offering price includes receiving a directive from the user to place the item into an electronic shopping cart, and receiving a directive from the user to perform a checkout process.

14. The method of claim 1, wherein determining that an item offered for sale at the first e-commerce site is of potential interest to the visitor includes determining that the visitor has visited a page on which the item is offered for sale.

15. The method of claim 1, wherein determining that an item offered for sale at the first e-commerce site is of potential interest to the visitor includes determining that the visitor has visited a page associated with a category of merchandise associated with the item.

16. The method of claim 1, wherein the item relates to a product.

17. The method of claim 1, wherein the item relates to a service.

18. A computer program product for pricing, the computer program product being embodied in a non-transitory computer readable storage medium and comprising computer instructions for:

detecting a visitor at a first e-commerce site;
determining that an item offered for sale at the first e-commerce site is of potential interest to the visitor, wherein determining that the item offered for sale at the first e-commerce site is of potential interest to the visitor includes determining that a URL was visited, wherein the URL relates to the item;
detecting a second e-commerce site at which the user has viewed the item, wherein the second e-commerce site is different than the first e-commerce site;
determining a competitive price, wherein the competitive price is associated with a web page, wherein the web page offered the item at the second e-commerce site;
calculating an offering price, wherein the offering price is based on the competitive price;
offering the item to the visitor at the offering price at the first e-commerce site; and
selling the item to the visitor at the offering price.

19. The computer program product of claim 18, wherein determining that the URL was visited includes setting style information associated with a link, wherein the link is associated with the URL.

20. The computer program product of claim 19, wherein setting style information relating to the URL includes defining a "visited" pseudoclass.

21. The computer program product of claim 19, wherein determining that the URL was visited includes receiving a request at a server, wherein the request is associated with the style information.

22. The computer program product of claim 18, wherein determining that the URL was visited includes analyzing data provided by a browser toolbar.

23. The computer program product of claim 18, wherein determining that the URL was visited includes determining an attribute associated with a link, wherein the link is associated with the URL.

24. The computer program product of claim 18, wherein determining the competitive price includes determining that the visitor has previously visited a plurality of competitors, and determining a plurality of competitive prices, wherein the competitive prices are respectively offered by the plurality of competitors, and selecting a minimum from among the plurality of competitive prices as the competitive price.

* * * * *